US011359871B2

(12) United States Patent
Vandermeer et al.

(10) Patent No.: US 11,359,871 B2
(45) Date of Patent: Jun. 14, 2022

(54) HEAT EXCHANGER WITH FLUID FLOW NORMALIZATION

(71) Applicant: DENSO International America, Inc., Southfield, MI (US)

(72) Inventors: John Vandermeer, Royal Oak, MI (US); Sean Schoneboom, Livonia, MI (US); Jason Spenny, Berkley, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 94 days.

(21) Appl. No.: 16/835,522

(22) Filed: Mar. 31, 2020

(65) Prior Publication Data

US 2021/0033357 A1 Feb. 4, 2021

Related U.S. Application Data

(60) Provisional application No. 62/887,852, filed on Aug. 16, 2019, provisional application No. 62/887,886, filed on Aug. 16, 2019, provisional application No. 62/884,922, filed on Aug. 9, 2019, provisional application No. 62/881,015, filed on Jul. 31, 2019.

(51) Int. Cl.
| | |
|---|---|
| *F28F 3/00* | (2006.01) |
| *F28F 3/08* | (2006.01) |
| *F28F 3/02* | (2006.01) |
| *F28D 9/00* | (2006.01) |
| *F28F 7/02* | (2006.01) |
| *F28F 13/06* | (2006.01) |
| *B33Y 80/00* | (2015.01) |

(52) U.S. Cl.
CPC .............. *F28F 3/086* (2013.01); *F28D 9/005* (2013.01); *F28D 9/0037* (2013.01); *F28D 9/0056* (2013.01); *F28D 9/0093* (2013.01); *F28F 3/02* (2013.01); *F28F 7/02* (2013.01); *F28F 13/06* (2013.01); *B33Y 80/00* (2014.12); *F28F 2250/06* (2013.01); *F28F 2255/00* (2013.01)

(58) Field of Classification Search
CPC ...... F28F 3/086; F28F 3/02; F28F 7/02; F28F 13/06; F28F 2250/06; F28F 2255/00; F28D 9/0037; F28D 9/005; F28D 9/0056; F28D 9/0093; B33Y 80/10
USPC ........................................................ 165/166
See application file for complete search history.

(56) References Cited

U.S. PATENT DOCUMENTS 2,650,077 A * 8/1953 Hammond ................ F28F 3/02
165/166
4,270,602 A * 6/1981 Foster .................... F28D 9/0043
165/167

(Continued)

*Primary Examiner* — Davis D Hwu
(74) *Attorney, Agent, or Firm* — Dickinson Wright PLLC

(57) ABSTRACT

A heat exchanger is provided with a unitary, single-piece structure that can be formed via 3D printing, for example. The heat exchanger includes a main body a plurality of plates stacked and integrally formed with the body. First fluid channels are defined by gaps in the material of the main body, and second fluid channels are defined by gaps in the material of the main body and are stacked with the first fluid channels in alternating fashion, separated by the plates. Each of the first fluid channels are fluidly coupled to two manifolds, and each of the second fluid channels are fluidly coupled to two more manifolds. One of the manifolds has a reduced interior volume to control and normalize fluid flow through the heat exchanger.

20 Claims, 13 Drawing Sheets

(56) References Cited

U.S. PATENT DOCUMENTS

2010/0314085 A1* 12/2010 Daly ................ F03B 13/00
 165/168
2012/0097365 A1 4/2012 Papoulis et al.

* cited by examiner

US 11,359,871 B2

HEAT EXCHANGER WITH FLUID FLOW NORMALIZATION

CROSS REFERENCE TO RELATED APPLICATIONS

The present patent application claims the benefit of the following U.S. Provisional Patent Applications: U.S. Provisional Patent Application No. 62/881,015, filed Jul. 31, 2019; U.S. Provisional Patent Application No. 62/884,922, filed Aug. 9, 2019; U.S. Provisional Patent Application No. 62/887,852, filed Aug. 16, 2019; U.S. Provisional Patent Application No. 62/887,866, filed Aug. 16, 2019; and U.S. Provisional Patent Application No. 62/887,886, filed Aug. 16, 2019. The above applications are incorporated by reference herein.

TECHNICAL FIELD

The present disclosure relates to a heat exchanger, and more particularly to a chiller heat exchanger with structure to normalize or control the flow of fluid therein.

BACKGROUND

Plate-type heat exchangers are used to transfer thermal energy between heat exchange working fluids. At least two heat exchange working fluid streams flow through separate flow passages defined between heat exchanger plates in the plate-type heat exchanger. Usually, the heat exchanger plates are arranged in a stacked relation, forming a part of the plate-type heat exchanger. The separate flow passages are defined by ports formed in the heat exchanger plates and flow channels formed between the heat exchanger plates.

Heat transfer between the working fluid streams can occur between two adjacent plates. For example, a first working fluid stream flows in one plate, and simultaneously a second working fluid stream flows in an adjacent plate of the stack. Thus, heat is exchanged between the two working fluid streams flowing through the stacked plates of the heat exchanger.

One type of plate-type heat exchanger is a chiller heat exchanger, which typically is used to cool the working fluids flowing through the chiller heat exchanger from a heat source such as an engine, a motor, or a battery of a vehicle, for example.

SUMMARY

In one embodiment, a heat exchanger includes a single-piece main body defining: a plurality of plates disposed in a stacked arrangement; a plurality of first fluid channels configured to transfer a first fluid, and a plurality of second fluid channels configured to transfer a second fluid, wherein the first fluid channels and the second fluid channels are interposed between the plates in alternating fashion along the stacked arrangement such that each of the first fluid channels is directly adjacent to a respective one of the second fluid channels and separated by a respective one of the plates; and four fluid manifolds including a first inlet manifold enabling the first fluid to enter the first fluid channels, a first outlet manifold enabling the first fluid to exit the first fluid channels, a second inlet manifold enabling the second fluid to enter the second fluid channels, and a second outlet manifold enabling the second fluid to exit the second fluid channels. At least one of the four fluid manifolds has a reduced interior volume compared to the other of the four fluid manifolds.

In another embodiment, a unitary, single piece heat exchanger includes: a plurality of plates in a stacked arrangement; a plurality of first fluid passages; a plurality of second fluid passages interposed between the plurality of first fluid passages in alternating fashion, each of the second fluid passages adjacent to two of the first fluid passages and separated therefrom by one of the plates; and a plurality of manifolds including a first manifold having a first volume and in fluid communication with the first fluid passages, a second manifold having a second volume and in fluid communication with the first fluid passages, a third manifold having a third volume and in fluid communication with the second fluid passages, and a fourth manifold having a fourth volume and in fluid communication with the second fluid passages, wherein the first volume is less than the second volume, the third volume, and the fourth volume.

In another embodiment, a unitary, single piece heat exchanger includes: a plurality of plates in a stacked arrangement; a plurality of first fluid passages; a plurality of second fluid passages interposed between the plurality of first fluid passages in alternating fashion, each of the second fluid passages adjacent to two of the first fluid passages and separated therefrom by one of the plates; and a plurality of manifolds. The manifolds include: a first manifold having a first outer wall and in fluid communication with the first fluid passages, a second manifold having a second outer wall and in fluid communication with the first fluid passages, a third manifold having a third outer wall and in fluid communication with the second fluid passages, and a fourth manifold having a fourth outer wall and in fluid communication with the second fluid passages, wherein an interior surface of the first outer wall extends inwardly toward a center of the heat exchanger such that a volume of the first manifold is less than a volume of the second manifold, the third manifold, and the fourth manifold individually.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
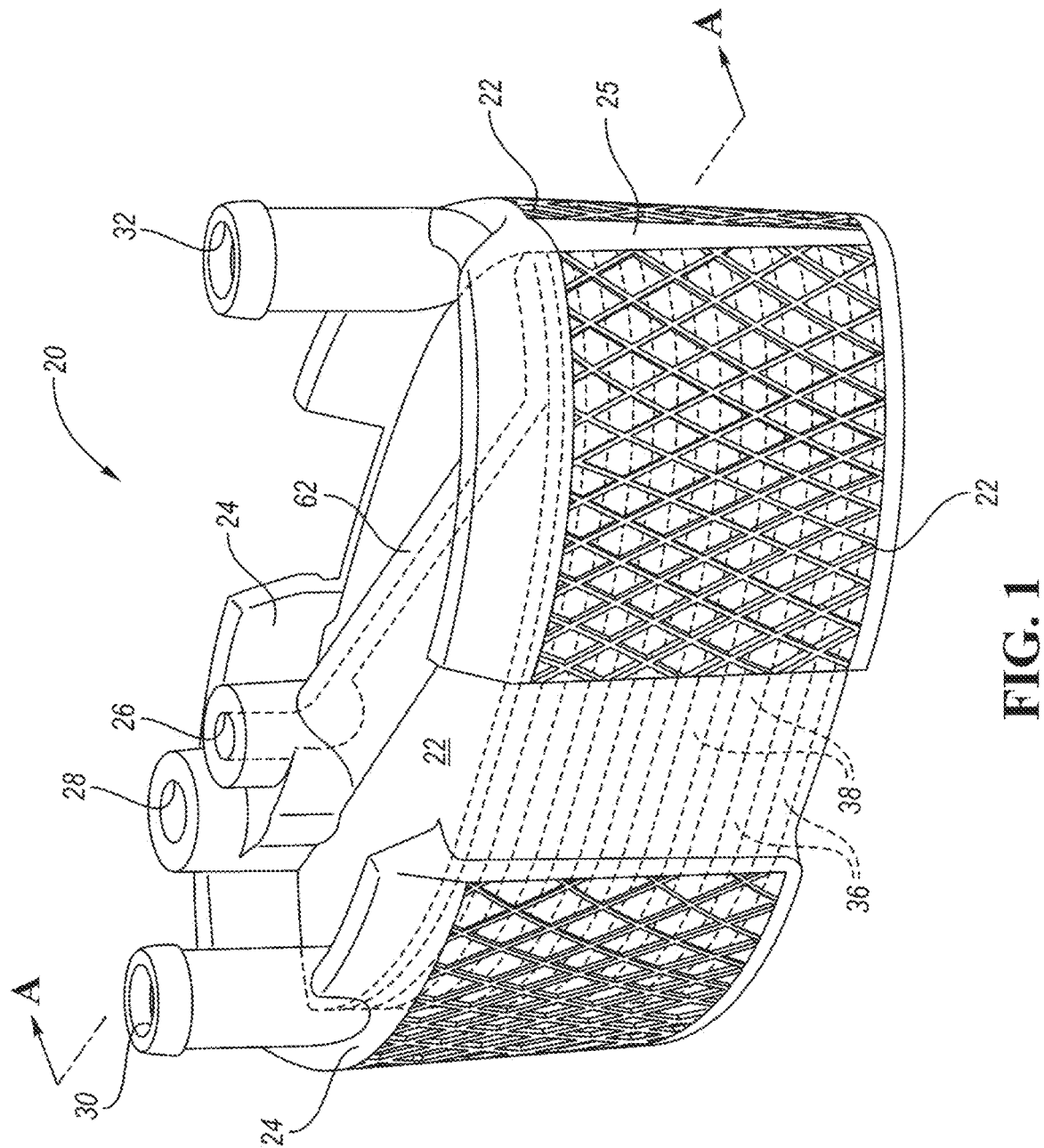
FIG. 1 illustrates a top perspective view of a heat exchanger according to one embodiment.

FIG. 1 illustrates a heat exchanger 20 according to one embodiment of the present disclosure. In one embodiment, the illustrated heat exchanger 20 is a chiller heat exchanger used to cool a traction battery for a battery-powered (or hybrid) automotive vehicle, with working fluids flowing through the chiller heat exchanger from a heat source (e.g., the battery). The teachings provided herein are not limited to only this type of heat exchanger. Rather, the heat exchanger can be one configured to use to cool an automotive engine, a motor, or other such heat source. And, the teachings provided herein can be applied in other non-automotive settings, such as commercial, residential, marine, aeronautical, and the like. In short, the heat exchanger 20 and others shown herein are merely exemplary, and the term "heat exchanger" should not be limited to only a chiller heat exchanger or just the type illustrated in the Figures.

The heat exchanger may include a main body 22. The main body 22 may define an outer shell, or housing of the heat exchanger 20. The main body 22 can be formed as a single, unitary piece, via, for example, three-dimensional (3D) printing. The material used to form the main body 22 can be metal, such as aluminum. In one embodiment of 3D printing, the part begins as a powder (e.g., metal such as aluminum) that can be laid down in thin layers that are melted and re-solidified only in the areas that will make up the final part. Various intricate flow chambers, passages, inlets, outlets, inlet manifolds and outlet manifolds (all of which are described below) can be defined by openings or gaps in the main body 22 (e.g., locations in which melting and solidifying of the metal does not take plate). The entire structure shown in the various Figures, such as FIGS. 1-2, may be an integrally formed, unitary piece. In other words, the single, integrally formed, unitary nature of the main body 22 of the heat exchanger 20 allows for heat to be exchanged within the main body 22 without the use of individually or separately connected plates. Indeed, as will be described below, the "plates" can be formed out of the main body 22 itself. This integrally formed nature of the heat exchanger 20 allows for various components described herein to have structural properties that were not possible with previous assembled heat exchangers.

The main body 22 has a general profile or shape that is oblong or football-shaped, having two elongated walls 24 meeting at corresponding narrow ends 25. At an upper portion of the heat exchanger 20 are a plurality of ports that can be formed or defined by the material of the main body 22 itself. These ports can include first and second inlet ports, and first and second outlet ports. In particular, these ports can include a first inlet port 26 defining a first inlet to the heat exchanger 20 and fluidly coupled to a first fluid outlet port 28 defining a first outlet of the heat exchanger 20. The ports can also include a second fluid inlet port 30 defining a second inlet to the heat exchanger 20 and fluidly coupled to a second fluid outlet port 32 defining a second outlet of the heat exchanger 20. The first inlet port 26 can be configured to connect to a supply of a first fluid, while the second fluid inlet port 30 can be configured to connect to a supply of a second fluid. Each of the ports may be defined by a projection extending outward form the main body 22 that has a hollow interior defining the respective inlet or outlet. During a heat exchange process, as will be described further herein, the first fluid can flow from the first inlet port 28 to the first fluid outlet port 28, and the second fluid can flow from the second fluid inlet port 30 to the second fluid outlet port 32. The first and second fluids can remain fluidly isolated by the material of the main body 22; passing the fluids across one another while separated by material of the main body 22 can exchange heat between the passing first and second fluids.

Although many different fluids may be used in a heat exchange process, in one embodiment the first fluid is a refrigerant (e.g., Hydrofluorocarbon (HFC), R-134, etc.) and the second fluid is a coolant (e.g., water, ethyl glycol, diethylene glycol, or propylene glycol, betaine, polyalkylene glycol, etc.) These working fluids are merely examples, and in other embodiments one or more of the fluids is or contains engine oil (if the heat exchanger is used to cool an engine), transmission oil (if the heat exchanger is used to cool a transmission), power-steering fluid (if the heat exchanger is used to cool a power-steering unit), and the like. In the illustrated embodiment and described herein, the heat exchanger 20 is a refrigerant-to-liquid heat exchanger as part of a battery cooling system for a battery of an automotive vehicle. However, in other embodiments, the heat exchanger can be a utilized or referred to as a liquid-to-liquid heat exchanger, refrigerant-to-coolant heat exchanger, oil-to-coolant heat exchanger, oil-to-refrigerant heat exchanger, etc.

Figure 2:
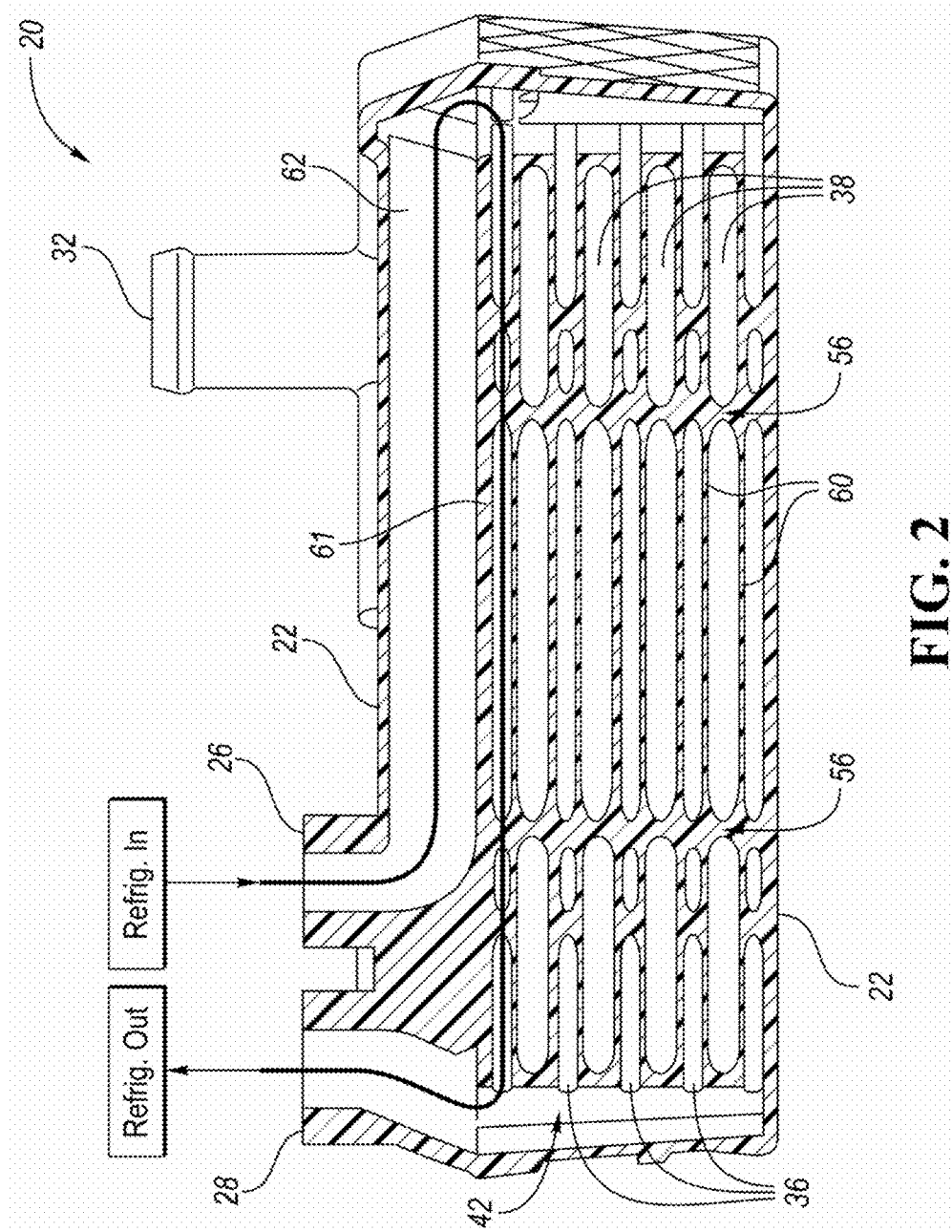
FIG. 2 illustrates a cross-sectional view taken along line A-A of FIG. 1, according to one embodiment.
Figure 3A:
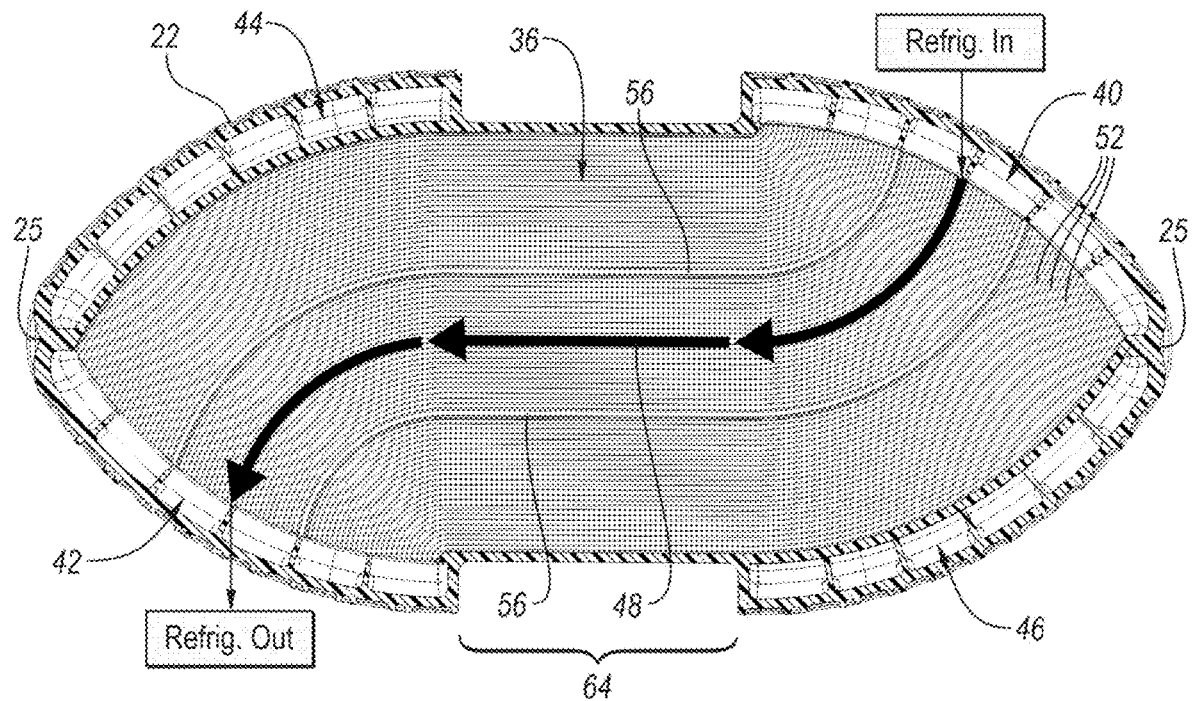
FIG. 3A illustrates a top schematic plan view of one fluid channel of the heat exchanger for a first type of fluid (e.g., refrigerant), according to one embodiment.
Figure 3B:
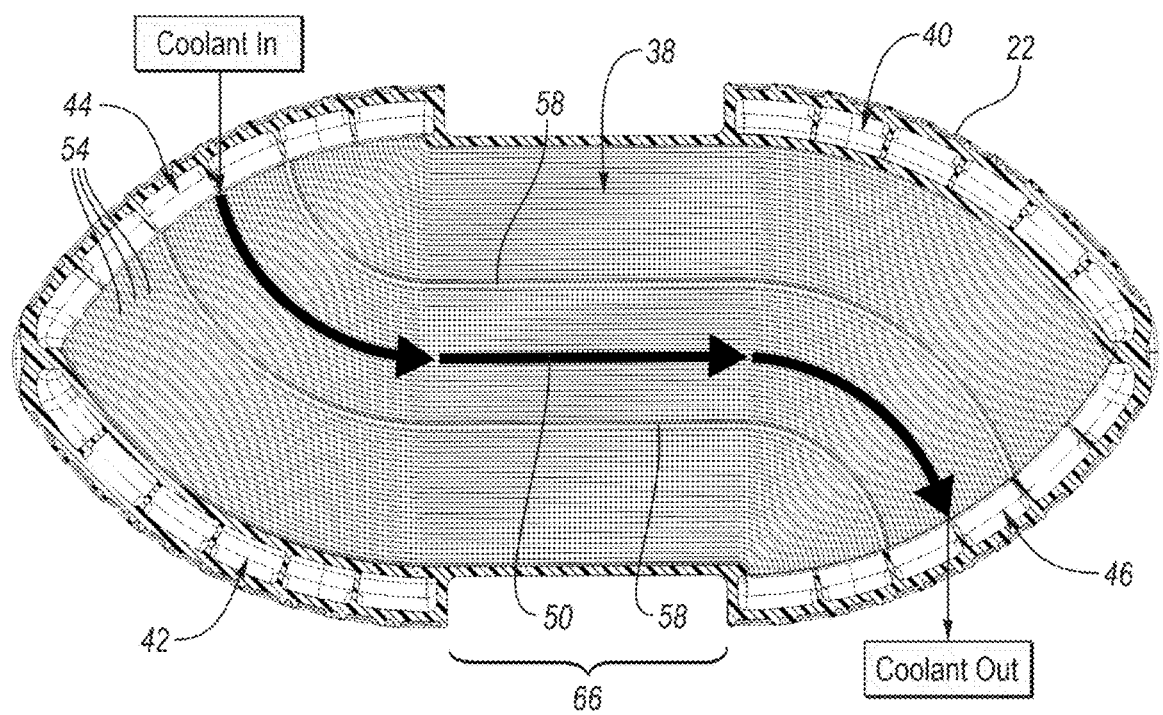
FIG. 3B illustrates a top schematic plan view of another fluid channel of the heat exchanger for a second type of fluid (e.g., coolant), according to one embodiment.

FIG. 2 is a cross-sectional view of the heat exchanger 20, taken along line A-A of FIG. 1. Referring to FIGS. 1-2, the main body 22 of the heat exchanger 20 can have a plurality of fluid channels (also referred to as flow channels, fluid passages fluid passages, etc.) defined therein by gaps or openings in the solid material of the main body 22. For example, the main body 22 may define a plurality of first fluid channels 36 configured to transport the first fluid, and a plurality of second fluid channels 38 configured to transport the second fluid. The fluid channels are stacked in alternating fashion, such that each of the first fluid channels 36 are vertically adjacent to one or two of the second fluid channels 38, and vice versa. FIG. 3A is a top view of one of the first fluid channels of the stack, and FIG. 3B is a top view of one of the second fluid channels 38 of the stack. FIG. 1 shows the stack of fluid channels 36, 38 in broken lines to schematically illustrate their position relative to the main body 22 of the heat exchanger 20.

Referring to FIGS. 1-3, the main body 22 of the heat exchanger 20 is also formed to define a plurality of manifolds. For example, the main body 22 may define a first inlet manifold 40, a first outlet manifold 42, a second inlet manifold 44, and a second outlet manifold 46. The first inlet manifold 40 permits the first fluid to flow into (enter) the first fluid channels 36, and the first outlet manifold 42 permits the first fluid to flow out of (exit) the first fluid channels 36. Likewise, the second inlet manifold 44 permits the second fluid to flow into the second fluid channels 38, and the second outlet manifold 46 permits the second fluid to flow from the second fluid channels 38. The first inlet port 26 is in fluid communication with the first inlet manifold 40 to permit the first fluid to flow into the heat exchanger 20, and the first fluid outlet port 28 is in fluid communication with the first outlet manifold 42 to permit the first fluid to flow out of the heat exchanger 20. Likewise, the second fluid inlet port 30 is in fluid communication with the second inlet manifold 44 to permit the second fluid to flow into the heat exchanger 20, and the second fluid outlet port 32 is in fluid communication with the second outlet manifold 46 to permit the second fluid to flow out of the heat exchanger 20.

The manifolds 40-46 extend vertically within the heat exchanger 20, fluidly connecting multiple fluid channels. For example, the first inlet manifold 40 and the first outlet manifold 42 each fluidly couple the stacked first fluid channels 36; the second inlet manifold 44 and the second outlet manifold 46 each fluidly couple the stacked second fluid channels 38. During operation, the first fluid entering the heat exchanger 20 via the first inlet port 26 flows downward through the first inlet manifold 40 whereupon the fluid can separate to enter the various first fluid channels 36. Then, the fluid travels horizontally through the first fluid channels 36 and recombines in the first outlet manifold 42, whereupon the first fluid can flow vertically upward and exit the first fluid outlet port 28. The second fluid can flow similarly through the second manifolds 44, 46, second fluid channels 38, and second inlet and outlet ports 30, 32.

The flow of the first fluid and the second fluid through the respective first fluid channels 36 and second fluid channels 38 is in a curved manner. For example, in the first fluid channel 36 shown in FIG. 3A, the fluid flows from a first quadrant to a third quadrant of the heat exchanger 20, and in a curved (e.g., non-linear) fashion. This flow path is represented by arrow 48. In the second fluid channel 38 shown in FIG. 3B, the fluid flows from a second quadrant to a fourth quadrant of the heat exchanger 20. This flow path is represented by arrow 50.

To further facilitate these flow paths, a first plurality of fins 52 are formed in the first fluid channel 36, and a second plurality of fins 54 are formed in the second fluid channel 38. The fins 52, 54 may be formed as part of the single, unitary main body 22 of the heat exchanger 20 via, e.g., 3D printing. The fins 52, 54 follow the general shape of the respective flow paths 48, 50 to direct the flow in that shaped path from the inlet manifold to the outlet manifold associated with each fluid channel. The fins 52, 54 may extend vertically from one or both of the upper and lower portions of the fluid channels 36, 38. In other words, the fins 52, 54 may extend partially into (or fully through) the fluid channels 36, 38 in the vertical direction. The fins 52, 54 may be more generally referred to as guides, and may have other shape or structure necessary to guide or influence the fluid in a certain direction.

Thicker, more pronounced fins may also be provided as structural reinforcement. For example, FIG. 3A illustrates two enlarged fins 56 following the general shape of the flow path 48, and FIG. 3B illustrates two enlarged fins 58 following the general shape of the flow path 50. These enlarged fins 56, 58 are wider than the smaller fins 52, 54 in the respective fluid channels 36, 38. These enlarged fins 56, 58 can extend vertically entirely through their respective fluid channel 36, 38. This is shown in FIG. 2, for example, in which the material of the main body 22 is shown to extend entirely vertically through the stack of fluid channels, representing the location of the enlarged fins 56 in the first fluid channel 36 in the cross-section. The fins 56, 58 provide structural reinforcement to the vertical stack of fluid channels. In other words, the fins 56, 58 may help support the material of the main body 22 that is directly above that fluid channel.

As mentioned above, the material of the main body 22 can itself define the fluid channels 36, 38. It can therefore be said that the material of the main body 22 can define "plates" of solid material vertically separating the stack of fluid channels 36, 38. For example, as shown in FIG. 2, a plurality of plates 60 may be located adjacent to respective fluid channels 36, 38. Each plate 60 may be interposed between two adjacent fluid channels. In one embodiment, a plurality of the plates 60 may each be interposed between a first fluid channel 36 and a second fluid channel 38, so that the first fluid channels 36 and second fluid channels 38 are stacked in alternating flow directions. With the ability to form the heat exchanger 20 via 3D printing, for example, the material of each plate 60 can be unitary and solid with the material of the other plates 60. This matter of formation (e.g., 3D printing) allows for the ability to design the heat exchanger 20 with more intricacy and precision, enabling precisely controlled flow patterns and packaging shapes, as well as the precise and detailed shape of smaller details such as the fins 52, 54.

Using the intricate forming methods such as 3D printing, a "hybrid counter cross flow" of fluid is enabled. For example, referring to FIGS. 3A-3B, the fins 52 of the first fluid channels 36 direct the first fluid in an S-shape, from the first input manifold 40 in the first quadrant to the first output manifold 42 in the third quadrant, as indicated by arrows 48. Meanwhile, the fins 54 of the second fluid channels 38 direct the second fluid in an S-shape mirrored to that of the first fluid channels 36, with the fluid flowing from the second input manifold 44 in the second quadrant to the second output manifold 46 in the fourth quadrant, as indicated by arrows 50. Likewise, the first inlet manifold 40 can be located in the first quadrant, diagonally across the heat exchanger 20 from the first outlet manifold 42 which is located in the third quadrant. And, the second inlet manifold 44 can be located in the second quadrant, diagonally across the heat exchanger 20 from the second outlet manifold 46. This creates a "cross" flow direction, with the first fluid flowing in a direction that crosses the second fluid in vertically-overlapping fluid channels 36, 38.

The first fluid channel 36 has a central region 64 of linear fluid flow, and the second fluid channel 38 has a corresponding central region 66 of linear fluid flow. These two central regions 64, 66 vertically overlap each other in the stacked arrangement described above. Therefore, as shown by the flow arrows 48 and 50 the first fluid flows directly counter to the second fluid within the two central regions 64, 66. This creates a "counter" flow of fluid, with the first fluid flowing generally 180 degrees (e.g., "counter") to the second fluid. Combining both the counter flow and the cross flow described above creates a hybrid counter cross flow profile, which provides optimum heat transfer through the heat exchanger 20.

The fins or guides 52, 54 can force the fluid to flow along arrows 48 in this "hybrid counter cross flow" path. For example, within the central regions 64, 66 of the stacked arrangement, the first fluid flows opposite or "counter" to the second fluid. In other words, a central region 64 of the first fluid channel has a flow direction that is opposite to a corresponding or overlapping central region 66 of the second fluid channel. Outside of the central regions 64, 66, the first fluid flows in a "cross" direction angled relative to the second fluid. In other words, in a region outside of the central region 64 of the first fluid channel, the flow direction of the first fluid is cross relative to an overlapping region of the second fluid channel. The "cross" direction can mean perpendicular, oblique, or transverse (e.g., laying across but not necessarily perpendicular), or the like.

Referring to FIGS. 1-2, the heat exchanger 20 can also be provided with a jumper pipe 62. Like other structure of the heat exchanger 20, the jumper pipe 62 may be formed via the same method (e.g., 3D printing) as part of the unitary, single-piece design. The jumper pipe 62 is located above the upper-most plate 61 of the stack of plates 60 such that the jumper pipe is vertically isolated above the fluid channels 36, 38 in which the hybrid counter cross flow heat exchange occurs. The jumper pipe 62 is a fluid channel or tube configured to carry the first fluid (e.g., refrigerant) from the first inlet port 26 and across the main body 22 before the first fluid is allowed to flow downward into the first inlet manifold 40 to access the stack of fluid channels 36. During this process in which fluid flows through the jumper pipe 62, the fluid directly may contact the upper-most plate 61.

By providing such a jumper pipe 62, the first inlet port 26 and first fluid outlet port 28 can be located adjacent to one another. The first inlet port 26 and first fluid outlet port 28 may be integrally formed as part of a common extrusion and configured to connect to a single fluid coupling. This allows for a single fluid connector or connection with a source of fluid to be made, rather than requiring two separate connection points (such as the second fluid inlet port 30 and second fluid outlet port 32). Fluid can flow in and out of the heat exchanger at a single localized region of the heat exchanger 20, allowing the first inlet port 26 and first fluid outlet port 28 to connect to a single unit carrying the first fluid. The dual region of the first inlet port 26 and the first fluid outlet port 28 can be referred to as an integrated block or mount. This enables an optimization of the location of the integrated mount to improve the refrigerant flow through the heat exchanger, reducing pressure drops. No separate connection is required between the plates 60 and the integrated mount, and therefore the overall size (e.g., height) of the heat exchanger 20 is reduced.

Moreover, by providing this jumper pipe 62 via 3D printing of the main body 22, the shape and design of the jumper pipe 62 can be intricately designed to maximize efficient fluid flow. By doing this, the jumper pipe 62 can take up as little space as possible, allowing its length to be reduced which, in turn, reduces fluid pressure drop across the jumper pipe 62. Additionally, integration of the jumper pipe 62 with the main body 22 in a singular unit allows the jumper pipe 62 and an upper-most plate 61 to have heat transfer therebetween, due to the upper-most plate also being a lower boundary of the jumper pipe 62. This improves performance of the heat exchanger 20. Moreover, integration of the jumper pipe 62 removes a step of assembling a separate jumper pipe to the heat exchanger, thus decreasing certain costs of manufacturing.

Figure 4:
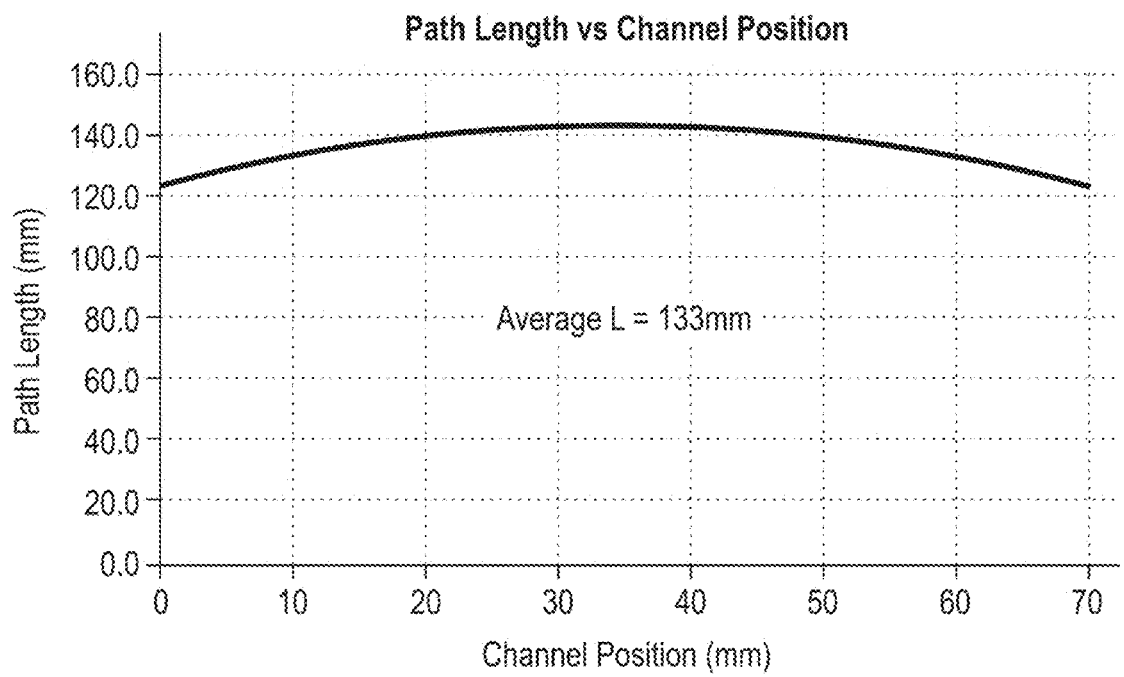
FIG. 4 illustrates a plot of a fluid path length versus a fluid channel position, according to one embodiment.

FIG. 4 is a graphical representation or a plot of a fluid path length versus a fluid channel position. Referring back to FIG. 3A for example, between each pair of adjacent fins 52 is a miniature channel. The starting position of each channel is what is plotted on the X-axis of the graph of FIG. 4. In other words, as the X-axis increases, the graph is referring to the distance (e.g., millimeters, mm) of the position of each channel from a boundary wall 24 of the heat exchanger 20. Meanwhile, the Y-axis refers to the length of each channel. As can be seen by this relationship, the channels closest to the boundary walls 24 of the heat exchanger 20 have the shortest flow path length, while the channel in the center of the fluid channel 36 has the longest flow path length. In the illustrated embodiment, the range of flow path lengths is between approximately 123 mm and 143 mm, with an average of approximately 133 mm. And, the maximum channel position distance (e.g., the curved length between the outer-most boundary channels) is approximately 70 mm.

These measurements are one embodiment, and other ranges of measurements may be utilized depending on the flow and size requirements of the heat exchanger 20. For example, in another embodiment, the flow path lengths can be between approximately 100 mm and 150 mm, and the maximum channel position distance can be between approximately 50 mm and 100 mm.

Figure 5:
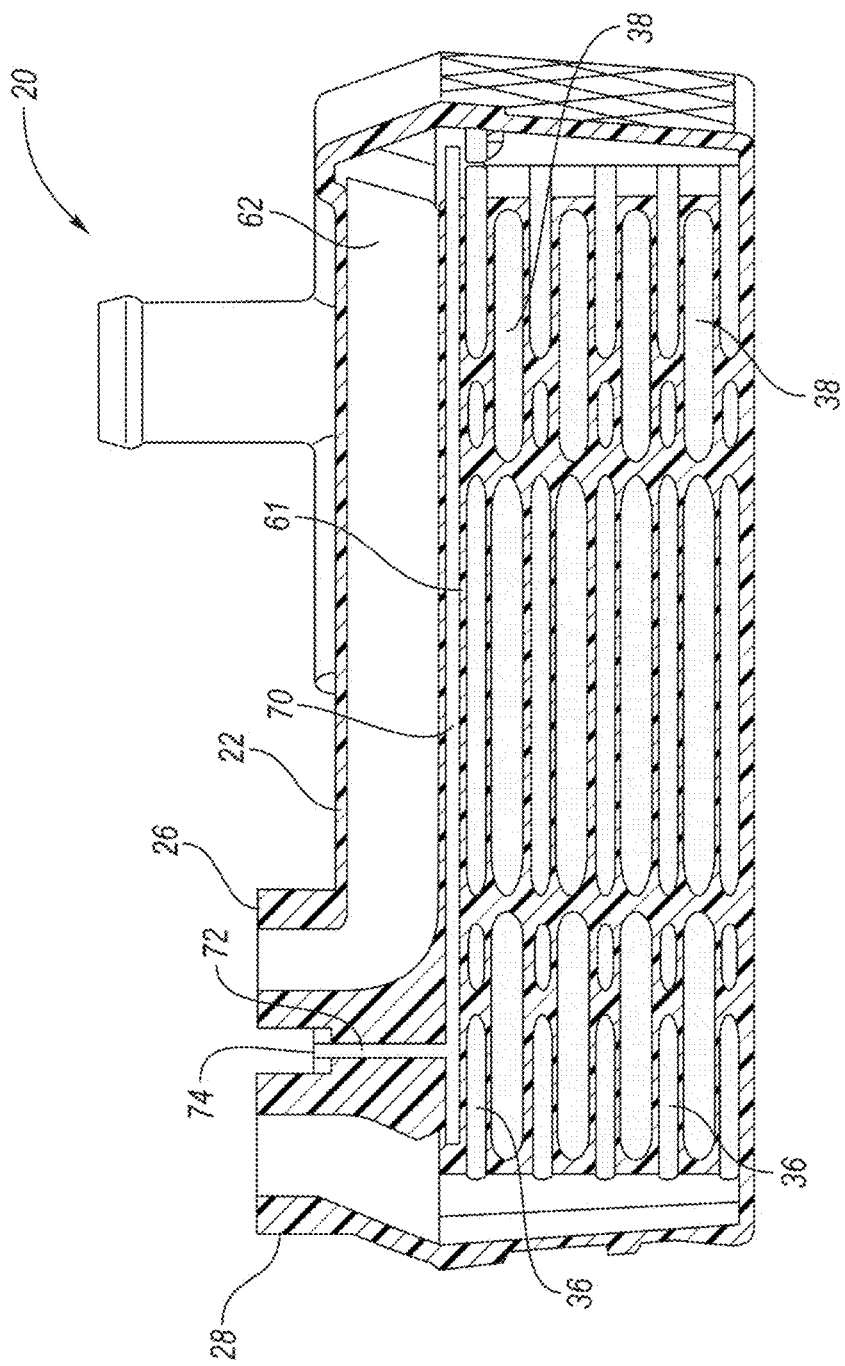
FIG. 5 illustrates a cross-sectional view taken along line A-A of FIG. 1, according to another embodiment.

FIG. 5 illustrates an embodiment in which the heat exchanger 20 includes a void or gap 70 between the jumper pipe 62 and the upper-most plate 61. It can also be said that the void or gap 70 is defined within the upper-most plate 61, between the jumper pipe 62 and the upper-most fluid channel. The void or gap 70 may be an absence of material of the main body 22 of the heat exchanger. This void or gap 70 may be formed during the formation process of the main body 22 (e.g., 3D printing). Alternatively, this void or gap 70 may be formed after the formation process of the main body 22 by, for example, milling or drilling to remove this material.

This void or gap 70 may be provided in embodiments in which unwanted heat transfer happens between the jumper pipe 62 and the upper-most plate 61. In embodiments in which such heat transfer is not desirable, the void or gap 70 helps to thermally insulate the fluid in the jumper pipe 62 from the fluid in the fluid channels 36, 38. The void or gap 70 may be filled with air, for example.

In one embodiment, the void or gap 70 is fluidly coupled to a powder-evacuation hole 72. The powder-evacuation hole 72 can be formed during the manufacturing of the main body 22 (e.g., 3D printing) to provide as a pathway to evacuation the excess or residual power leftover from the 3D printing of the material surrounding the void or gap 70. The powder-evacuation hole 72 can be open to the atmosphere at opening 74. During manufacturing, an operator may insert tool (such as a vacuum or air-pressure source) through the opening 74 and into the powder-evacuation hole 72, whereupon activation of the tool can force the residual powder to evacuate the void or gap 70 through the powder-evacuation hole 72. In the illustrated embodiment, the void or gap 70 runs in a direction parallel to the length of the fluid channels 36, 38, and the powder-evacuation hole 72 extends transverse (e.g., perpendicular) to the void or gap 70. The powder-evacuation hole 72 can extend in a space between the first inlet port 26 and first fluid outlet port 28, for example. The powder-evacuation hole 72 can be capped or otherwise sealed after the powder from the 3D printing is removed from the void or gap 70.

Figure 6:
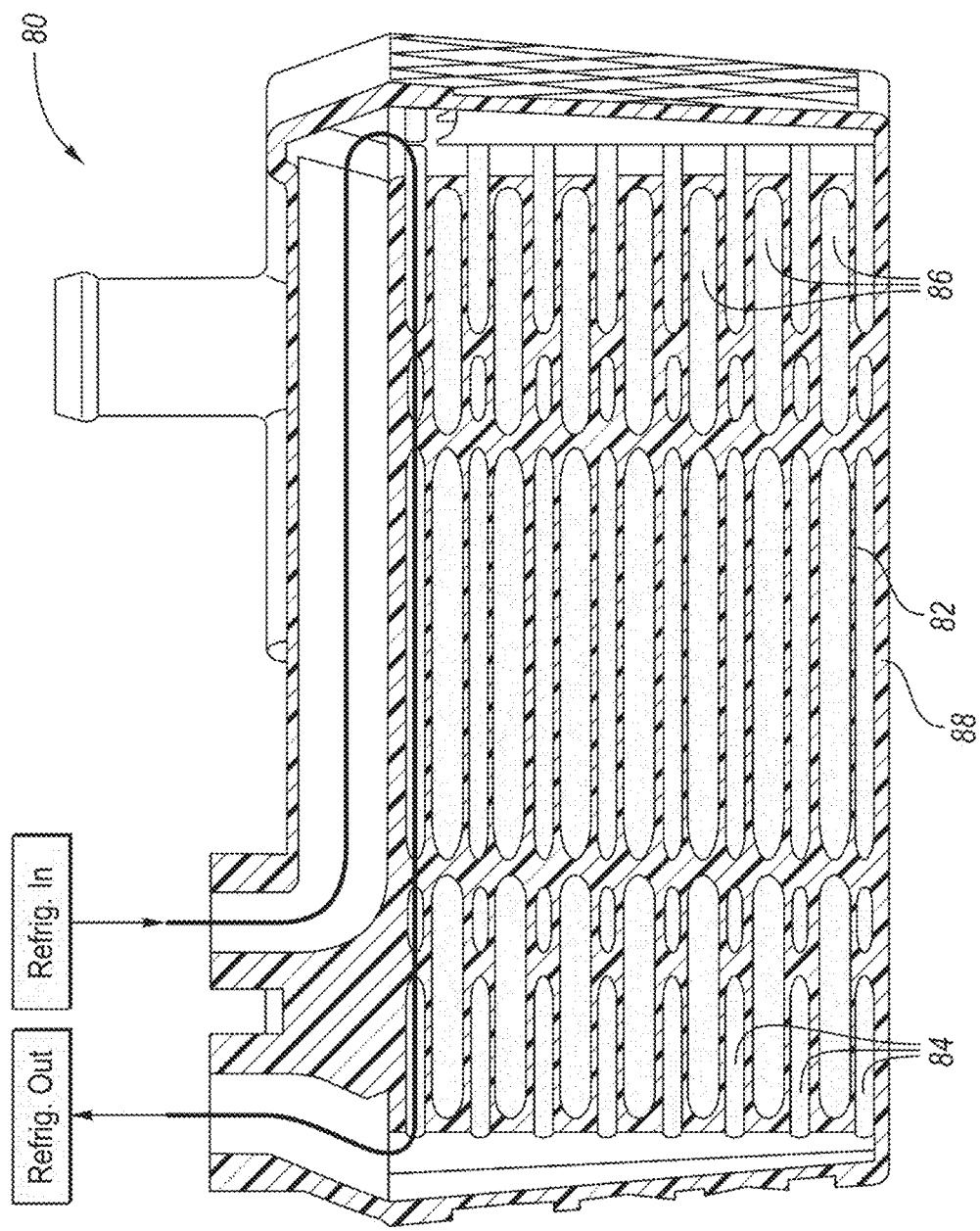
FIG. 6 illustrates a similar cross-sectional view of another heat exchanger, according to another embodiment.

FIG. 6 shows another embodiment of a heat exchanger 80. In the interest of brevity, the heat exchanger 80 includes all of the basic features of the heat exchanger 20, unless otherwise described below. In this embodiment, the heat exchanger 80 includes a larger stack of plates 82 than the previous embodiment, and therefore a larger stack of first fluid channels 84 and second fluid channels 86. Any number of plates 82 and first fluid channels 84 and second fluid channels 86 may be used, depending on vehicle packaging requirements. In this embodiment, eight (8) first fluid channels 84 are utilized, and seven (7) second fluid channels are utilized. Moreover, in this embodiment, the plates 82 can have varying thicknesses. For example, a bottom-most plate 88, which directly borders one of the first fluid channels 84, can be thicker than the other plates 82 that are located vertically between a pair of fluid channels 84, 86.

Figure 7:
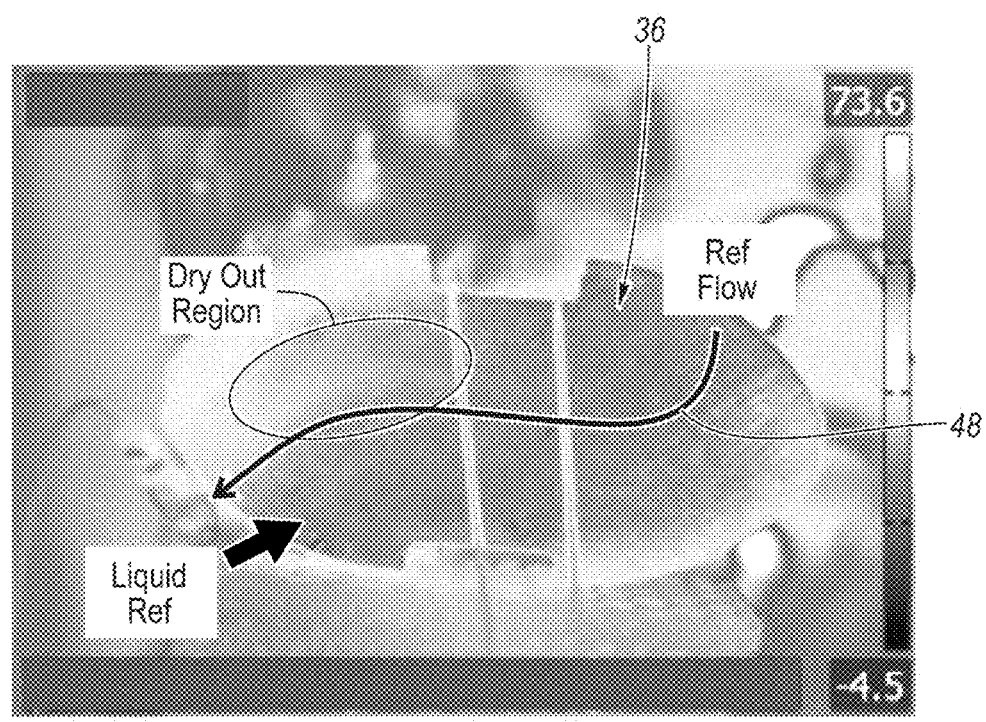
FIG. 7 illustrates a heat map of a fluid channel of FIG. 3A, according to one embodiment.

FIG. 7 illustrates a heat map or thermal image of a fluid channel, such as the first fluid channel 36 illustrated in FIG. 3A, according to one embodiment. As shown in this view, the first fluid (e.g., refrigerant) is flowing in the direction of arrow 48, as explained with reference to FIG. 3A. The darker shaded regions indicate a lower fluid temperature, and the lighter regions indicate a higher fluid temperature. As can be seen in FIG. 7, there may be a "dry out region". This region shows a presence of uneven heat transfer (e.g., an uneven amount of heat being removed from the refrigerant). This is indicated by the lighter color creeping into this dry out region. This uneven heat transfer can disrupt fluid flow within the first fluid channel 36.

Figure 8A:
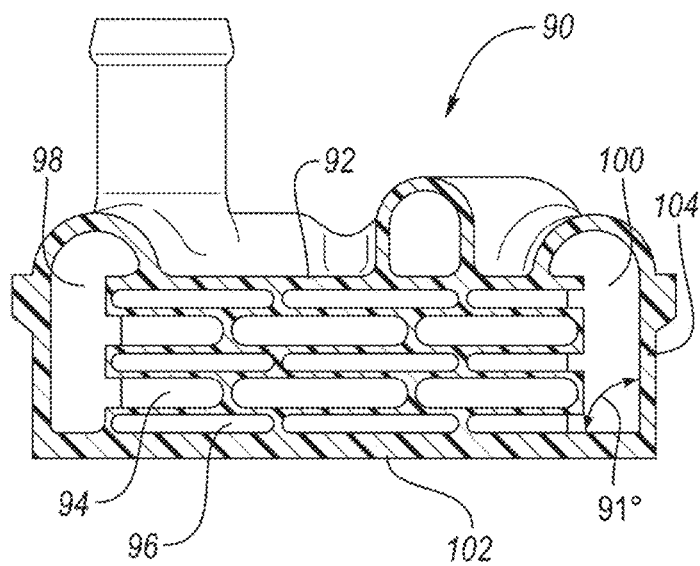
FIG. 8A illustrates a cross-sectional view of a heat exchanger having a manifold according to a first embodiment.
Figure 8B:
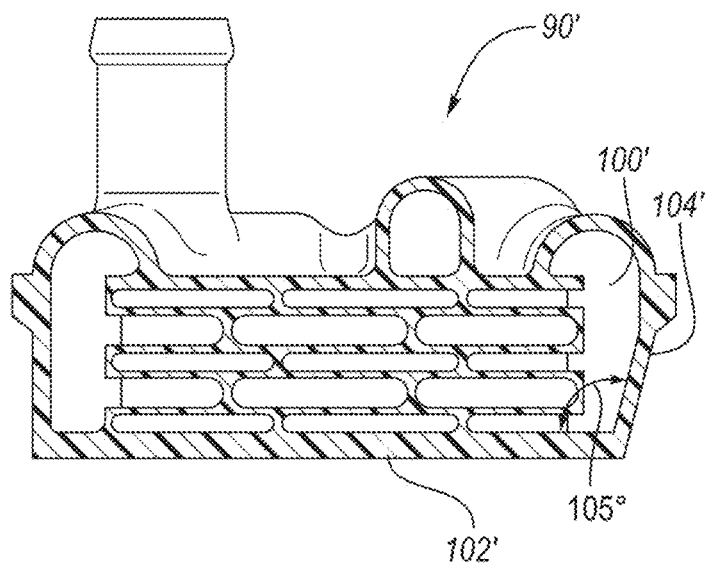
FIG. 8B illustrates a cross-sectional view of a heat exchanger having a manifold according to a second embodiment.
Figure 8C:
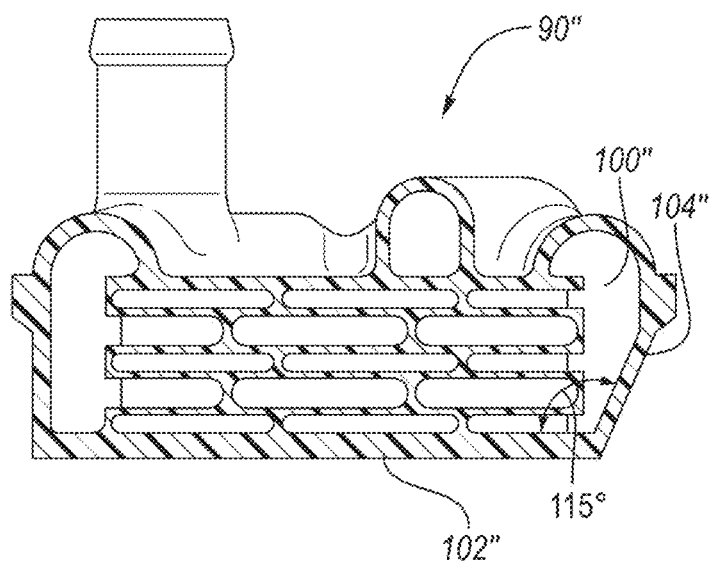
FIG. 8C illustrates a cross-sectional view of a heat exchanger having a manifold according to a third embodiment.

FIGS. 8A-8C provide three different heat exchanger bodies that are provided to combat the problems with the uneven heat transfer explained with reference to FIG. 7. As will be explained, the heat transfer distribution can be controlled by modifying an angle of one or more of the walls of the manifolds in which the fluid collects.

For example, FIG. 8A illustrates a heat exchanger 90 according to one embodiment. The heat exchanger 90 may include the structure or characteristics of the heat exchangers explained in previous embodiments, unless otherwise stated. Similar to embodiments above, the heat exchanger 90 may have a main body 92 formed via, e.g., 3D printing. This manufacturing method allows a stack of fluid channels, such as first fluid channels 94 and second fluid channels 96, to be formed by voids in the material of the main body 92. The first fluid channels 94 can receive a first fluid from a first inlet manifold 98 and transfer it to a first outlet manifold (not shown), while the second fluid channels 96 can receive a second fluid from a second inlet manifold 100 and transfer it to a second outlet manifold (not shown). Each manifold may be defined by the material of the unitary structure of the main body 92. For example, the second inlet manifold 100 may be defined in part by a lower floor 102 and an outer wall 104. An angle is defined between the lower floor 102 and the outer wall 104. As shown in the embodiment in FIG. 8A, this angle may be 91 degrees or generally perpendicular.

Changing this angle can impact the flow characteristics of the fluid flowing into or out of the fluid channels to normalize the heat exchange distribution. For example, FIG. 8B shows a similar heat exchanger 90' having similar structure as the heat exchanger 90 of FIG. 8A, except for a larger angle between its lower floor 102' and an outer wall 104'. In this embodiment, the angle between the lower floor 102' and the outer wall 104' is 105 degrees. This effectively narrows the interior volume of the second inlet manifold 100' at a lower portion thereof to restrict flow of the second fluid in that portion of the second inlet manifold 100'. This does not increase the pressure of the second fluid, but rather decreases the flow rate of the second fluid in this reduced-volume area of the manifold, which correspondingly increases the fluid flow in other regions of the heat exchanger. Adjusting the angle or interior volume of the manifold during manufacturing (e.g., 3D printing) can tune the heat exchange process throughout the heat exchanger to account for potential abnormalities in the heat exchange distribution.

FIG. 8C illustrates another embodiment with an increased angle between a lower floor and outer wall of a manifold. In particular, the heat exchanger 90" has a second inlet manifold 100" defined by a lower floor 102" and an outer wall 104". The angle at the intersection of the lower floor 102" and the outer wall 104" in this embodiment is 115 degrees. This can even further reduce the volume within the second inlet manifold 100" in the lower region thereof, which can again restrict fluid flow in that region, and increase fluid flow in another region of the heat exchanger 90".

While the embodiments described above regarding FIGS. 8A-8C explain adjustment of an angle of a second inlet manifold 100, 100' 100", it should be understood that this sort of manipulation of shape and volume can be applied to any of the manifolds of the heat exchanger. For example, any or all of the first or second inlet manifolds or first or second outlet manifolds can have similar adjustments to their interior volume and angle of intersection between a floor and an outer wall.

Moreover, the precise angles described in FIGS. 8A-8C of 91 degrees, 105 degrees, and 115 degrees are merely exemplary. Other ranges of angles can be utilized. And of course, to combat certain heat exchange abnormalities, it may be necessary to reduce the angle to less than 90 degrees, for example 80 degrees, to effectively increase the interior volume of the manifold in the lower region thereof.

Figure 9A:
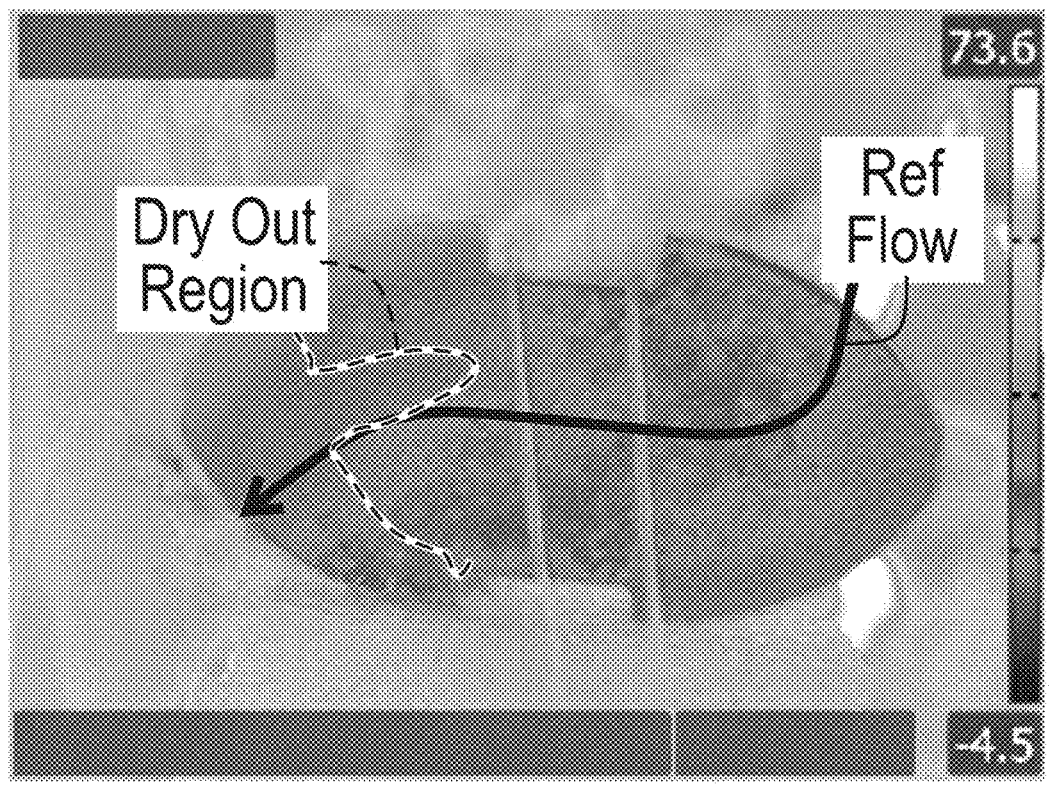
FIG. 9A illustrates a heat map of a fluid channel.

FIG. 9 illustrates another heat map or thermal image of a fluid channel, such as the first fluid channel 36 illustrated in FIG. 3A, according to one embodiment similar to that portrayed in FIG. 7. Once again, a "dry out" region is similarly portrayed, as explained above. The lighter-shaded regions illustrate an uneven heat exchange distribution, with heightened temperature being shown in a specific region of the fluid channel (e.g., toward the outlet manifold, and in the second and third quadrant). This can negatively impact the performance of the heat exchanger 20 in general. This uneven, non-uniform heat transfer may be caused by the shape of the hybrid counter cross flow path nature of the heat exchanger 20 itself. For example, due to the rounded corners (e.g., narrowed ends 25) and rounded shape of manifolds 40, 42, 44, 46 that come with the hybrid counter cross flow path design, the fluid channels located in the middle of the fluid passages 36, 38 are longer than the fluid channels located at the ends of the fluid passages 36, 38, as explained above with reference to FIG. 4. This may lead to characteristics similar to the heat map shown in FIG. 9A in which the fluid in the "dry out" region is refrigerant in a gas form, and the remainder of the refrigerant in a liquid. This may cause a spike in fluid transfer abnormalities at the transition phase between liquid to gas, along the line labeled in FIG. 9A.

Figure 9B:
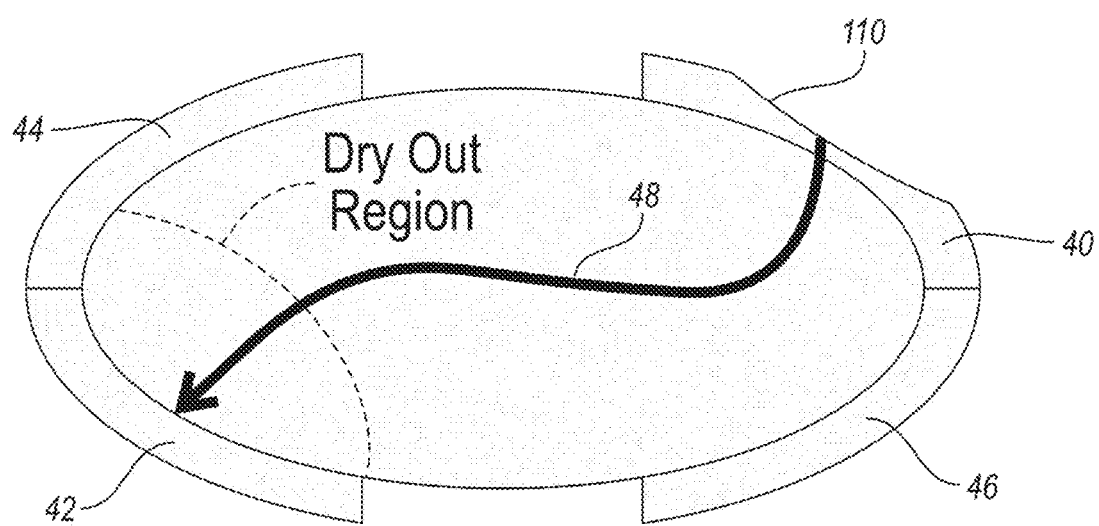
FIG. 9B illustrates the fluid channel with a manifold shape to control flow distribution, according to one embodiment.

FIG. 9B shows another embodiment of solving this "dry out" phenomena to improve the performance of the heat exchanger 20. According to this embodiment, an interior volume of the first inlet manifold 40 is reduced. This can restrict fluid flow and normalize or even-out the heat distribution. To reduce the volume of the first inlet manifold 40, the first inlet manifold 40 can be shaped with a cut-out surface 110. In other words, the exterior surface of the first inlet manifold 40 can be concave or otherwise indented to reduce the interior volume. In particular, the interior volume of the first inlet manifold 40 can be reduced more toward the center of the first inlet manifold 40. Said another way, and referring to FIGS. 8A-8C, the interior of the outer wall 104 can be convex or otherwise protrude into the interior of the manifold 40 to create a smaller interior volume, while the interior of the outer wall 104 at the other manifolds 42-46 may be planar or concave to create a larger interior volume. The same teachings can be applied to the second inlet manifold 44, as the case may be. This restricts fluid flow in the miniature channels (defined between the fins 52 described above) that are toward the center of the first fluid channel 36 compared to the miniature channels that are toward the perimeter of the first fluid channel.

In other embodiments, the interior volume of the first inlet manifold 40 is reduced in other fashions. For example, the thickness of the interior of the first inlet manifold can remain consistent (like the other manifolds 42, 44, 46), but thinner than the other manifolds. In another embodiment, all of the outer walls of the manifolds 40-46 are convex (e.g., concave from the interior perspective), but the outer walls of the other three manifolds 42, 44, 46 is more convex (or concave) than the first inlet manifold 40.

Once again, it should be understood that the teachings of FIG. 9B should not be construed as to only applying to the first inlet manifold 40. The reduction in volume of the other manifolds can also be performed depending on the desired fluid flow characteristics.

Figure 10:
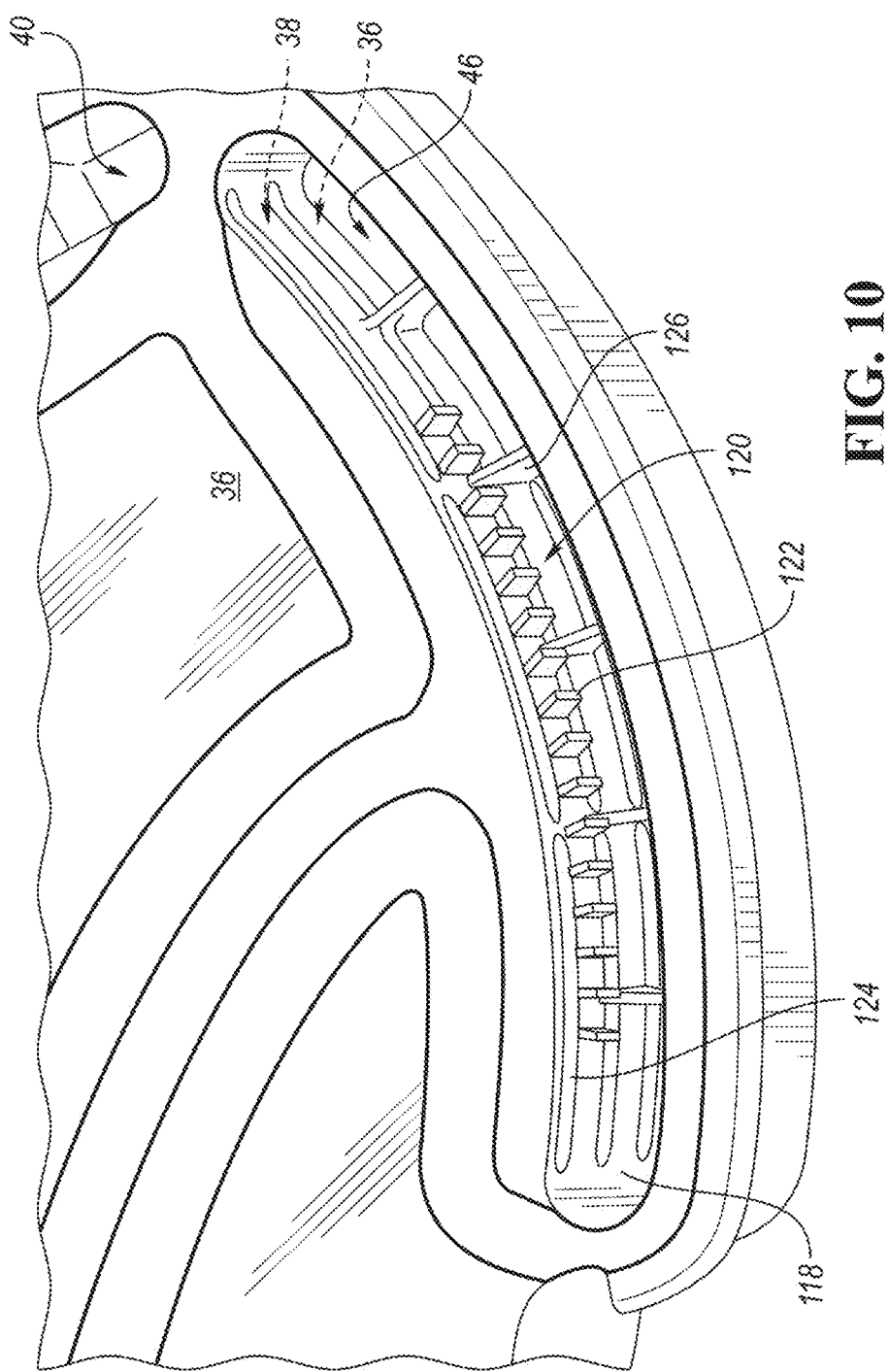
FIG. 10 illustrates one embodiment of an interior of a fluid manifold of a heat exchanger.

FIG. 10 illustrates a top perspective cut-away view of one embodiment of an interior of a fluid manifold of a heat exchanger. The illustrated fluid manifold can be any of the fluid manifolds described herein, but for illustrated purposes, the fluid manifold is the second outlet manifold 46. The view shown is a cross-section view through one of the second fluid channels 38, namely at a location where the second fluid channel 38 meets the second outlet manifold 46. Looking into the second outlet manifold 46, the location of the stacked, alternating first and second fluid channels 36, 38 are shown behind an interior side wall 118 of the second outlet manifold 46.

In order to maximize contact area between hot and cold fluid passages of the heat exchanger 20, the second outlet manifold 46 is provided with a plurality of surface features 120 therein. The surface features 120 are formed via the same forming process (e.g., 3D printing) as the remainder of the main body 22 of the heat exchanger 20. The surface features 120 can be extensions or protrusions formed to extend into the interior volume of the second outlet manifold 46.

The surface features 120 may include a plurality of fins 122. The fins 122 may be projections or protrusions extending generally horizontal from the interior side wall 118 of the second outlet manifold 46. In other embodiments, the fins 122 may be dimples, vanes, or other projections or protrusions that provide additional surface area contact between fluid in the second outlet manifold 46 and the material of the main body 22 of the heat exchanger 20.

The surface features 120 may also include ribs 124. The ribs 124 may extend along the curved contour of the second outlet manifold 46, along the interior side wall 118 thereof. The ribs 124 may be generally longitudinal, and may extend generally transverse or perpendicular to the fins 122. In one embodiment, a pair of ribs 124 may extend on either vertical side of a row of fins 122, as shown in FIG. 10.

The surface features 120 may also include enlarged projections 126 extending into the second outlet manifold 46. The enlarged projections 126 may be located between a pair of ribs 124 in which the fins 122 are not located. In other words, going downward into the second outlet manifold 46, each layer of adjacent ribs 124 has, therebetween, a plurality of fins 122 or a plurality of enlarged projections 126, in alternating fashion.

In one embodiment, each rib 124 is horizontally aligned with one of the plates 60. In other words, each rib 124 is provided at a location between opposing fluid channels (e.g., between one of the first fluid channels 36 and one of the second fluid channels 38).

Figure 11:
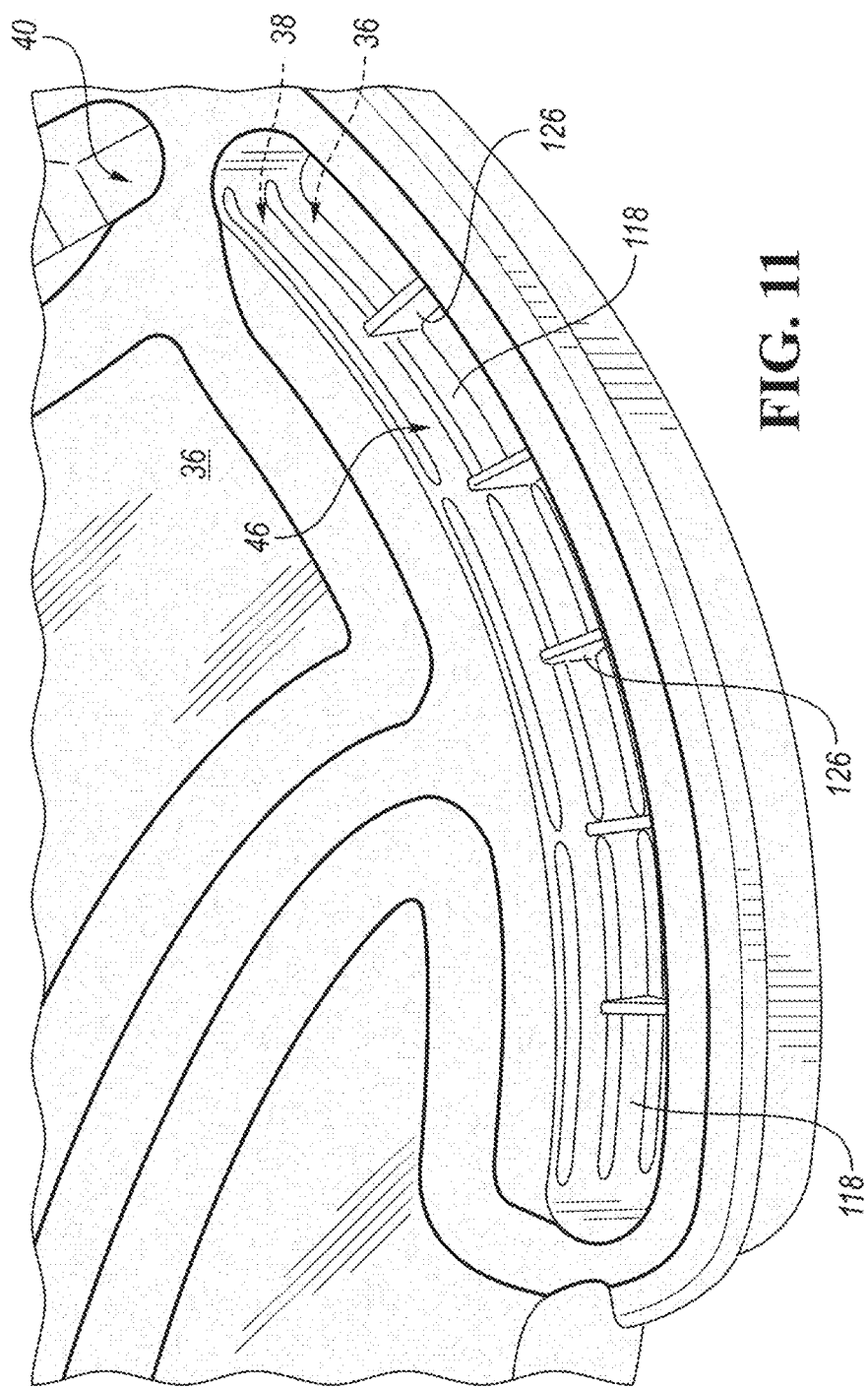
FIG. 11 illustrates another embodiment of an interior of a fluid manifold of a heat exchanger.

FIG. 11 illustrates a similar view as FIG. 10, removing some of the fins 122 to highlight the enlarged projections 126. The enlarged projections 126 may also be referred to as structural bridges 126. The interior side wall 118 may be relatively thin to enable a proper, efficient heat transfer between the opposing first and second fluids. To better support the interior side wall 118, the structural bridges 126 may extend outwardly therefrom. Each structural bridge 126 may be tapered or otherwise sloped to enlarge downwardly. The structural bridges 126, while in the second outlet manifold 46, may be aligned with the first channels 36 such that they are aligned with the first fluid that does not enter the second outlet manifold 46. This allows the structural bridges 126 to not only structurally support the interior side wall 118, but also provide added heat transfer benefits to the heat exchanger 20 by increasing the surface area of heat exchange between the first fluid and the second fluid.

Figure 12:
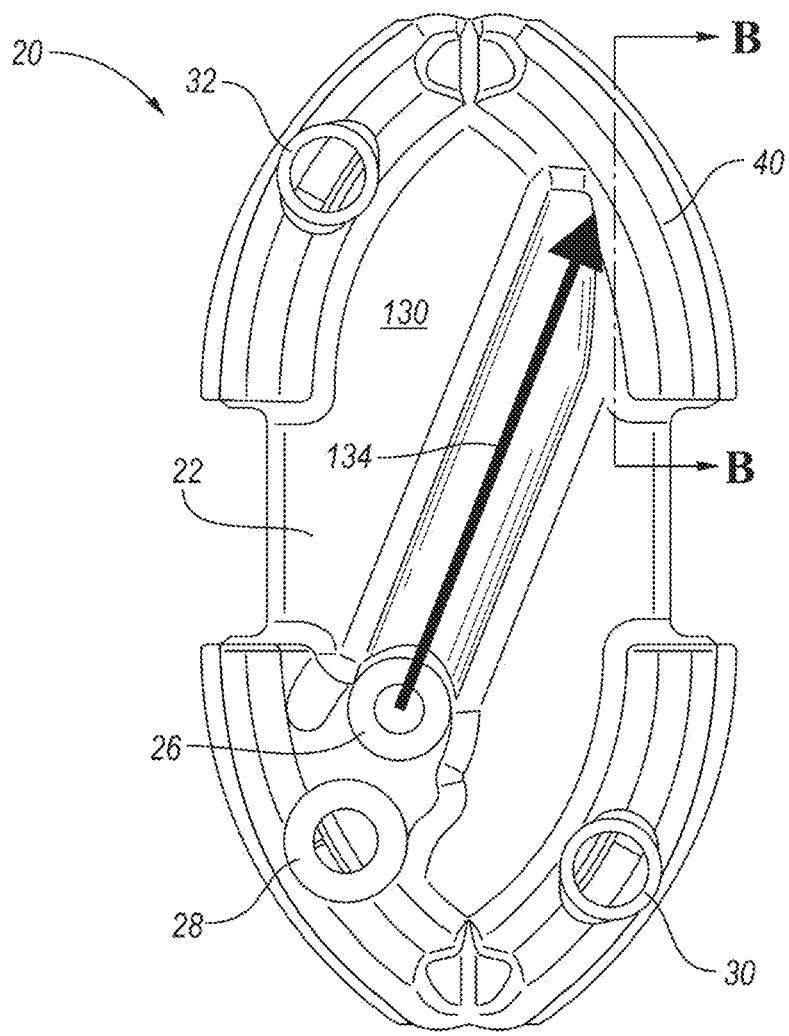
FIG. 12 illustrates a top plan view of a body (e.g., top plate) of a heat exchanger with a jumper pipe according to one embodiment.

FIG. 12 illustrates a top plan view of the heat exchanger 20, highlighting an upper surface 130 of the main body 22. The first fluid inlet 26 and first fluid outlet 28 are also visible, as is the second fluid inlet 30 and second fluid outlet 32 that are each in fluid communication with a respective fluid manifold, as described above.

Figure 13:
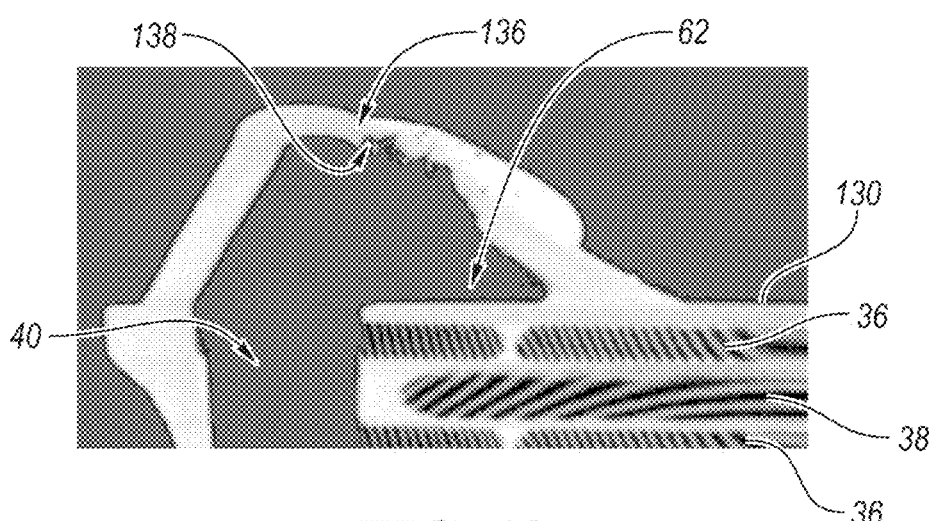
FIG. 13 illustrates a cross-sectional view along line B-B of FIG. 12, according to one embodiment.

An upper surface 132 of the jumper pipe 62 is also illustrated. As explained above, the jumper pipe 62 transports fluid from the first fluid inlet 26 into the first inlet manifold 40. This flow direction within the jumper pipe 62 is illustrated with arrow 134, which is linear. As can be seen in FIG. 12 as well as FIG. 13 (which is a cross-sectional view taken along line B-B of FIG. 12), by having the jumper pipe 62 integrated into the heat exchanger 20 (e.g., via 3D printing), this can create sharp angles at the intersection of the jumper pipe 62 and the first fluid manifold 40. The material that makes up the upper surface 130 of the main body 22 has the potential to be relatively weak at certain locations, for example locations 136 and 138 labeled in FIG. 13 at the intersection of the jumper pipe 62 and the first fluid manifold 40. If 3D printing is utilized for manufacturing, during the printing process, the sharp angles create the potential for the printer recoater to interact with the part itself, which can cause a tear or leak.

Figure 14:
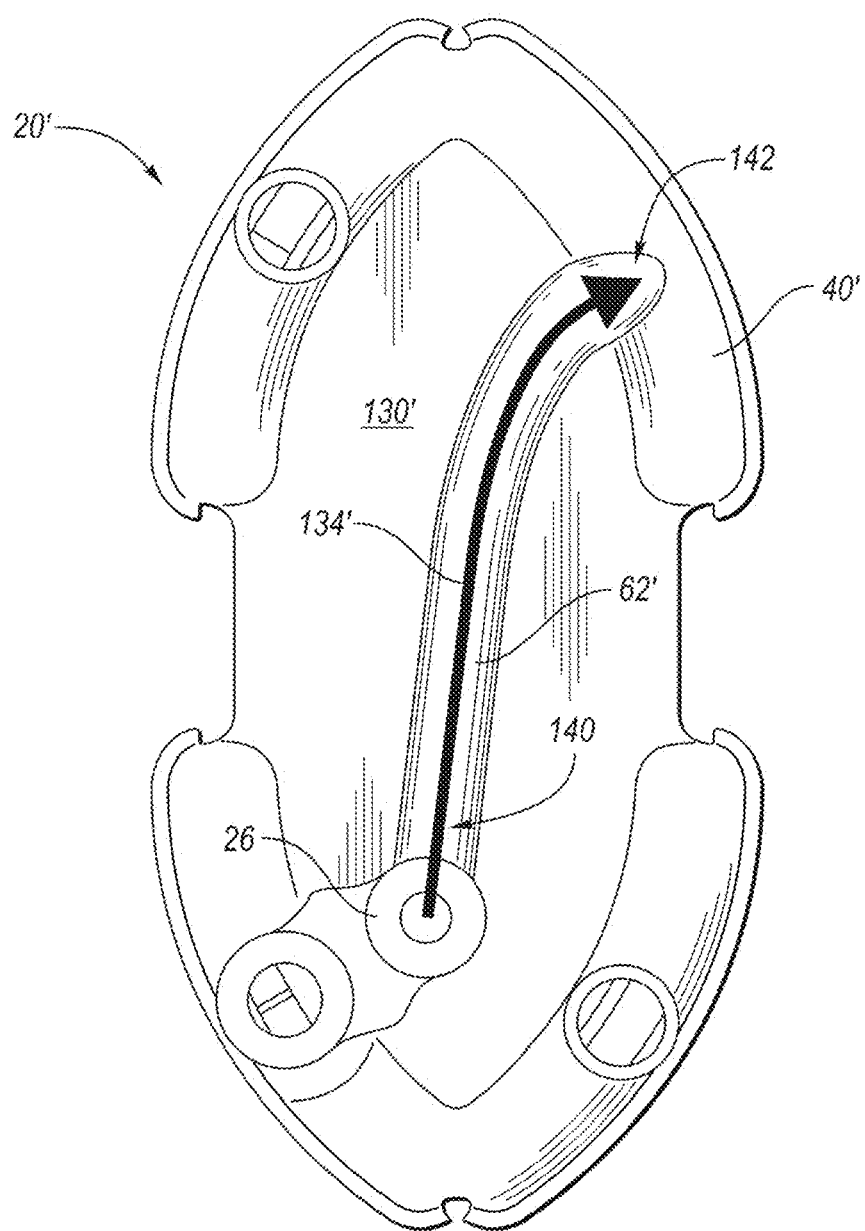
FIG. 14 illustrates a top plan view of a body (e.g., top plate) of a heat exchanger with a jumper pipe according to another embodiment.

FIG. 14 illustrates another embodiment of with a redesigned jumper pipe to reduce the presence of such sharp angles. In this embodiment, the heat exchanger 20' has an upper surface 130' defining a jumper pipe 62' having a curved shape, indicated by arrow 134'. This creates angles of intersection between the jumper pipe 62' and the first inlet manifold 40' that have more favorable angles for 3D printing.

The jumper pipe 62' may be J-shaped. In one embodiment, the jumper pipe 62 includes a first end 140 adjacent to the first fluid inlet, and a second end 142 adjacent to the first inlet manifold 40'. The jumper pipe can extend linearly at the first end 140, and curved at the second end 142. In other words, the jumper pipe 62' can include a linear section (e.g., closer to the first end 140) and a curved section (e.g., closer to the second end 142). The curve at the second end 142 can be such that the second end 142 is directed to intersect the first inlet manifold 40' at more of a perpendicular angle relative to the direction shown in FIG. 12. The angle of intersection between the second end 142 of the jumper pipe 62' and the first inlet manifold 40' may be generally perpendicular (e.g., between 80 and 100 degrees, or more particularly between 85 and 95 degrees). In another embodiment, the jumper pipe 62' may be S-shaped such that both the first end 140 and the second end 142 are curved, and the flow path 134' does not have a significant portion that is linear.

Figure 15A:
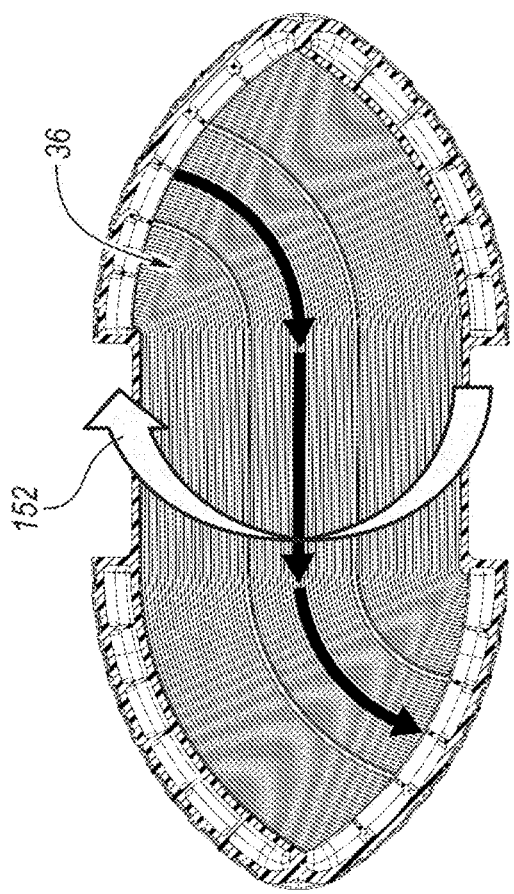
FIG. 15A illustrates a top plan view of a fluid channel of a heat exchanger with an arrow indicating a twist.
Figure 15B:
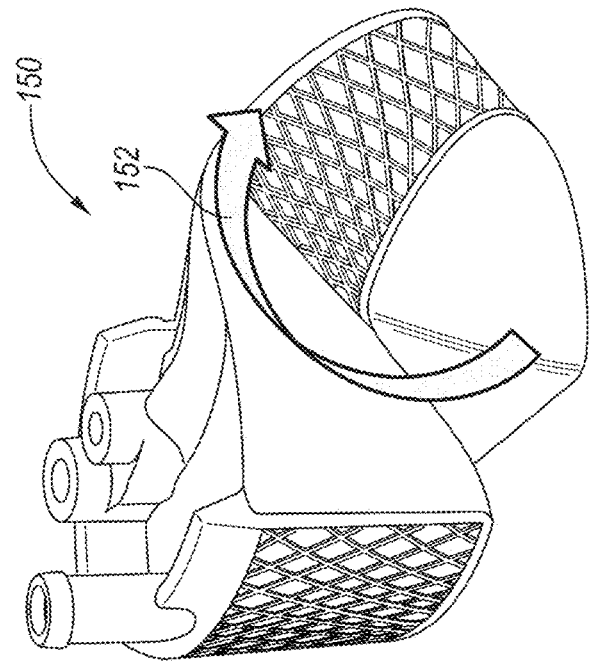
FIG. 15B illustrates a top perspective view of a heat exchanger with a twisted flow path, according to one embodiment.

FIGS. 15A and 15B collectively illustrate another embodiment of an overall shape of a heat exchanger 150. The shape of the heat exchanger 150 is shown in FIG. 15B. To help visualize this shape, FIG. 15A illustrates a top schematic plan view of the first fluid channel 36 of the heat exchanger described with reference to FIG. 3A, with a twist arrow 152. This twist arrow 152 indicates a direction in which the shape of the heat exchanger can be "twisted" to create the new shape of the heat exchanger 150 shown in FIG. 15B. The heat exchanger 150 can be manufactured to this shape with the above-disclosed manufacturing methods (e.g., 3D printing). The "twisting" can be performed along a longitudinal axis of the heat exchanger 20. Essentially, one end (e.g., to the left in FIGS. 15A-15B) can be maintained stationary, and the other end (e.g., to the right in FIGS. 15A-15B) can be twisted around this axis. This can create the desired shape shown in FIG. 15B.

The addition of a twist in the central section of the heat exchanger can elongate the miniature channels within the first fluid channel 36, for example. With the twisted design, the miniature channels furthest from the central twist axis can increase in length, while the miniature channels closest to the axis will not. This can create a heat exchanger 150 with uniform channel lengths (e.g., the plotted line in FIG. 4 would be straight and horizontal), which can normalize the heat transfer process.

The words used in this specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A heat exchanger comprising:
a single-piece main body defining:
a plurality of plates disposed in a stacked arrangement,
a plurality of first fluid channels configured to transfer a first fluid, and a plurality of second fluid channels configured to transfer a second fluid, wherein the first fluid channels and the second fluid channels are interposed between the plates in alternating fashion along the stacked arrangement such that each of the first fluid channels is directly adjacent to a respective one of the second fluid channels and separated by a respective one of the plates,
four fluid manifolds including a first inlet manifold enabling the first fluid to enter the first fluid channels, a first outlet manifold enabling the first fluid to exit the first fluid channels, a second inlet manifold enabling the second fluid to enter the second fluid channels, and a second outlet manifold enabling the second fluid to exit the second fluid channels,
wherein at least one of the four fluid manifolds has a reduced interior volume compared to the other of the four fluid manifolds.

2. The heat exchanger of claim 1, wherein the main body is a single, unitary piece, and the fluid channels and manifolds are defined by voids in the main body.

3. The heat exchanger of claim 1, wherein:
the first inlet manifold is in a first quadrant of the heat exchanger,
the first outlet manifold is in a third quadrant of the heat exchanger,
the second inlet manifold is in a second quadrant of the heat exchanger, and
the second outlet manifold is in a fourth quadrant of the heat exchanger.

4. The heat exchanger of claim 1, wherein the first inlet manifold is located diagonally across the heat exchanger from the first outlet manifold, and the second inlet manifold is located diagonally across the heat exchanger from the second outlet manifold.

5. The heat exchanger of claim 4, wherein the first inlet manifold is directly adjacent the second outlet manifold on one side of the heat exchanger, and the second inlet manifold is directly adjacent the second outlet manifold on another side of the heat exchanger.

6. The heat exchanger of claim 1, wherein the one and only one of the four fluid manifolds has a reduced interior volume compared to the other of the four fluid manifolds.

7. The heat exchanger of claim 1, wherein the one of the four fluid manifolds having a reduced interior volume is the first inlet manifold.

8. The heat exchanger of claim 1, wherein each of the four fluid manifolds is defined by a floor of the main body and an outer wall of the main body, wherein the lower floor and outer wall at the one of the four fluid manifolds define an angle therebetween that is greater than the at the other of the four fluid manifolds.

9. The heat exchanger of claim 8, wherein the angle between the lower floor and the outer wall at the one of the four fluid manifolds is at least 105 degrees.

10. The heat exchanger of claim 1, wherein each of the four fluid manifolds is defined by a floor of the main body and an outer wall of the main body, wherein the outer wall at the one of the four fluid manifolds is concave, and the outer wall at the other of the four fluid manifolds is convex.

11. The heat exchanger of claim 1, wherein each of the four fluid manifolds is defined by a floor of the main body and an outer wall of the main body, wherein an interior surface of the outer wall at the one of the four fluid manifolds protrudes into the one of the four fluid manifolds to a greater degree than at the other of the manifolds.

12. A unitary, single piece heat exchanger comprising:
a plurality of plates in a stacked arrangement;
a plurality of first fluid passages;
a plurality of second fluid passages interposed between the plurality of first fluid passages in alternating fashion, each of the second fluid passages adjacent to two of the first fluid passages and separated therefrom by one of the plates; and
a plurality of manifolds including a first manifold having a first volume and in fluid communication with the first fluid passages, a second manifold having a second volume and in fluid communication with the first fluid passages, a third manifold having a third volume and in fluid communication with the second fluid passages, and a fourth manifold having a fourth volume and in fluid communication with the second fluid passages, wherein the first volume is less than the second volume, the third volume, and the fourth volume.

13. The heat exchanger of claim 12, wherein the first manifold is defined by a floor and an outer wall, wherein the outer wall tapers inwardly in a downward direction toward the floor.

14. The heat exchanger of claim 13, wherein the outer wall at the second and third fluid manifolds does not taper inwardly in the downward direction.

15. The heat exchanger of claim 14, wherein the outer wall at the fourth fluid manifold does not taper inwardly in the downward direction.

16. The heat exchanger of claim 12, wherein each of the plurality of manifolds is defined by a floor and an outer wall, wherein an interior surface of the outer wall at the first manifold extends a greater distance into the first manifold than interior surfaces of the outer wall at the second, third, and fourth manifolds.

17. The heat exchanger of claim 16, wherein the interior surface of the outer wall at the first manifold is convex, and the interior surfaces of the outer wall at the second, third, and fourth manifolds is concave.

18. A unitary, single piece heat exchanger comprising:
a plurality of plates in a stacked arrangement;
a plurality of first fluid passages;
a plurality of second fluid passages interposed between the plurality of first fluid passages in alternating fashion, each of the second fluid passages adjacent to two of the first fluid passages and separated therefrom by one of the plates; and
a plurality of manifolds including:
a first manifold having a first outer wall and in fluid communication with the first fluid passages, a second manifold having a second outer wall and in fluid communication with the first fluid passages, a third manifold having a third outer wall and in fluid communication with the second fluid passages, and a fourth manifold having a fourth outer wall and in fluid communication with the second fluid passages, wherein an interior surface of the first outer wall extends inwardly toward a center of the heat exchanger such that a volume of the first manifold is less than a volume of the second manifold, the third manifold, and the fourth manifold individually.

19. The heat exchanger of claim 18, wherein the interior surface of the first outer wall is convex, and interior surfaces of the second outer wall, the third outer wall, and fourth outer wall are concave.

20. The heat exchanger of claim 18, wherein a distance between center of the heat exchanger and the interior surface of the first outer wall is less than:
a distance between the center and an interior surface of the second outer wall,
a distance between the center and an interior surface of the third outer wall, and
a distance between the center and an interior surface of the fourth outer wall.

* * * * *